March 4, 1958  J. H. McCRACKEN, JR., ET AL  2,825,543
GAS-LIQUID CONTACT APPARATUS
Filed June 21, 1954  2 Sheets-Sheet 1
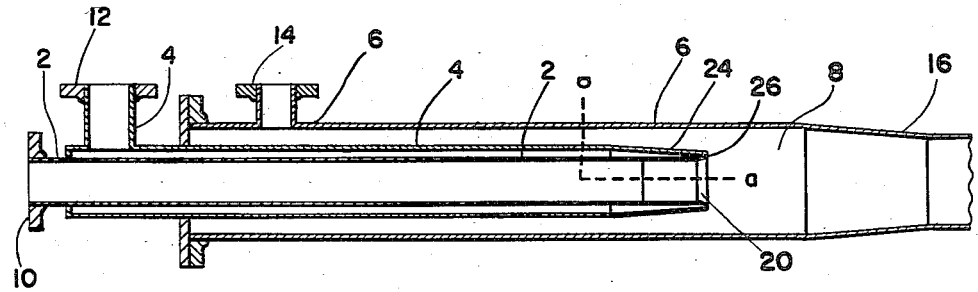
FIG. I
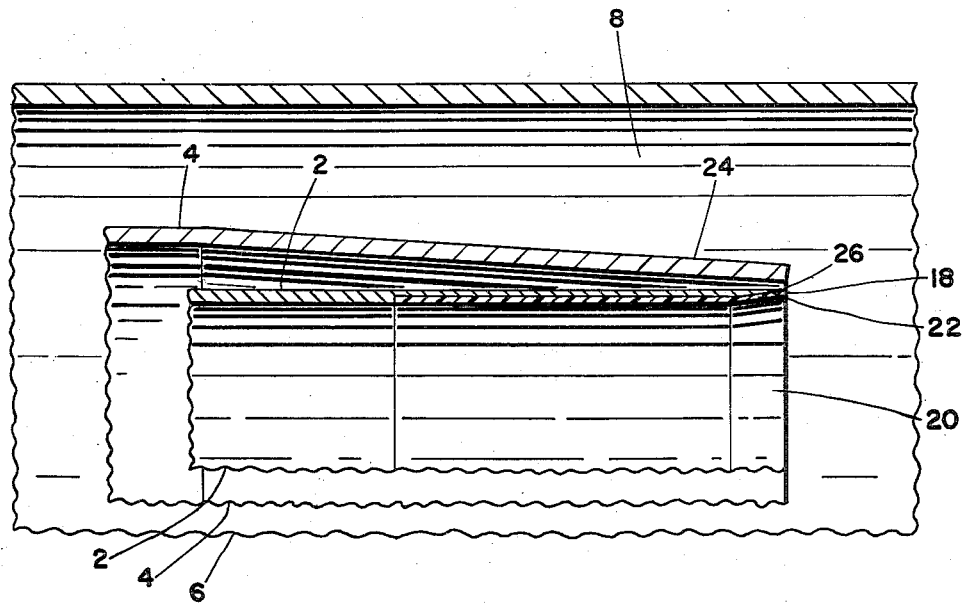
FIG. II
INVENTOR
JOHN H. McCRACKEN, JR.
ERNEST L. BOLICK
BY
ATTORNEY

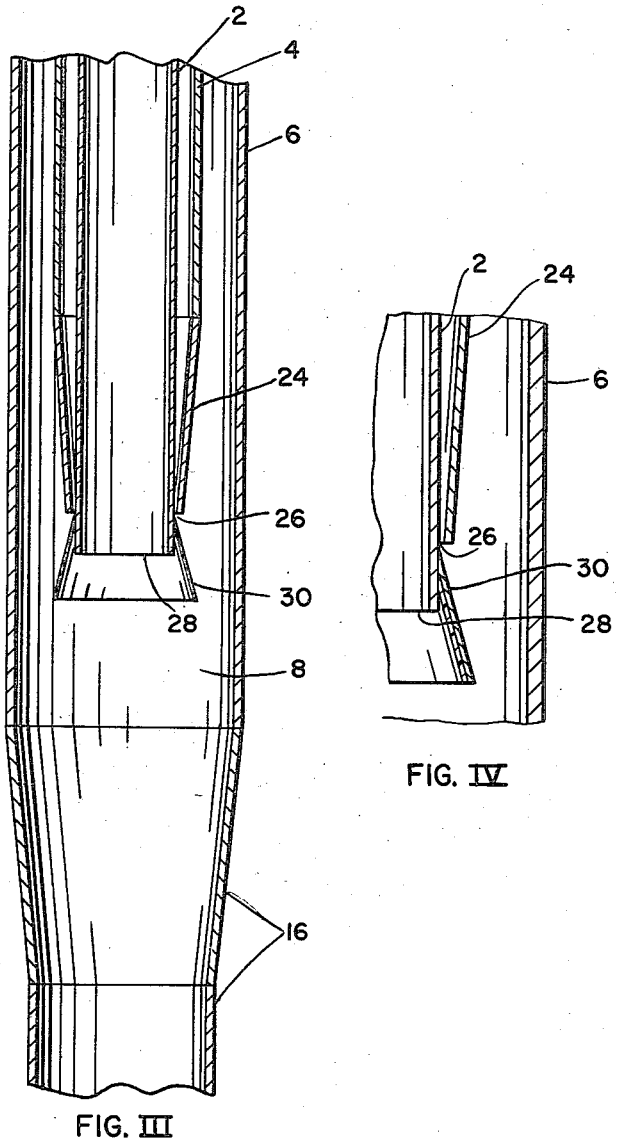
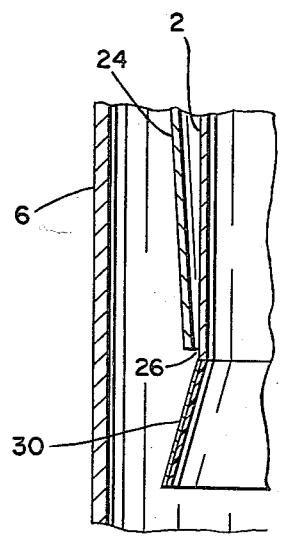

United States Patent Office 2,825,543
Patented Mar. 4, 1958

2,825,543

GAS-LIQUID CONTACT APPARATUS

John H. McCracken, Jr., North Madison, and Ernest L. Bolick, Mentor, Ohio, assignors to Diamond Alkali Company, Cleveland, Ohio, a corporation of Delaware Application June 21, 1954, Serial No. 437,935

9 Claims. (Cl. 261—118)

This invention relates to an apparatus for efficiently effecting gas-liquid contact, and more particularly relates to an apparatus for efficiently scrubbing a gas stream with a liquid in order to remove substances associated with the gas stream, and still more particularly relates to an apparatus for obtaining slurries of solids in liquid media.

It has heretofore been proposed to scrub a stream of gas with a liquid in order to remove substances associated with the gas. For the most part, these proposals have employed systems wherein gas and liquid streams are passed countercurrently to one another, and comparatively complex apparatus are required to effect efficient scrubbing of the gas stream. For example, it has been proposed to pass a gas stream to be scrubbed into the bottom of a scrubbing tower wherein the gas, and materials associated therewith, are contacted by a discontinuous mass of liquid (droplets) flowing countercurrently thereto from a series of trays or baffles arranged on the internal walls of the tower, in order to remove the materials associated with the gas.

One of the objects of the present invention is to provide an apparatus, simple in design, and of high operating efficiency, for effecting gas-liquid contact.

Another object of the invention is to provide an apparatus, for effecting gas-liquid contact of gas streams having particles of solid or liquid material associated therewith, in such a manner that highly efficient separation of the gas and associated material is obtained.

A further object of the invention is to provide an apparatus for scrubbing a gas stream containing suspended solid materials, which apparatus is not subject to plugging by the solid material which has been wetted by the liquid scrubbing medium.

These and other objects will be apparent to those skilled in the art from the description of the invention presented hereinafter.

It has now been found that much more efficient scrubbing of a gas stream is effected by certain modifications and improvements in prior apparatus employed for this purpose. Thus, it has been found that such prior apparatus, providing a contact chamber for liquid and gas, with means for introducing gas and liquid streams into said chamber, is greatly increased in its scrubbing efficiency where there is also provided means for supplying a stream of liquid completely surrounding said gas stream as said gas stream enters said chamber, said means for supplying the stream of liquid being adapted to form a sheet of said liquid completely surrounding said stream of gas, as it enters said chamber, means to cause said stream of gas to move radially outwardly against said sheet of liquid, means for exhausting gas from said chamber, and means for removing said liquid from said chamber. Also, in accordance with the present invention, there is provided an improved method for scrubbing gases with liquids, which method includes the steps of passing a stream of gas into a scrubbing zone, passing a stream of liquid into said zone concurrently with said stream of gas in such a manner that said stream of liquid completely surrounds said stream of gas as said streams enter said zone, causing said stream of gas to expand in said zone while said stream of gas moves in contact with said stream of liquid, passing the expanded stream of gas against said stream of liquid and in a direction countercurrent thereto, and separately removing said streams from said zone.

Referring now to the drawings attached hereto and made a part hereof,

Fig. I is a diagrammatic cross-section of one form of apparatus incorporating the principles of the present invention, Fig. II is an enlarged half-section of the apparatus of Fig. I along the lines a—a, with parts broken away, Fig. III is a cross-section of an apparatus which is a modification of the apparatus of Figs. I and II, also incorporating the principles of the present invention, Fig. IV is an enlargement of a portion of the apparatus of Fig. III, with parts broken away, and Fig. V is an enlargement, with parts broken away, of a modification of the apparatus of Fig. III.

The apparatus shown on the drawings comprises three concentric conduits, the innermost conduit 2 being adapted to carry a stream of gas, such as air, with solid material suspended in the gas stream. Surrounding conduit 2 is conduit 4, adapted to carry a stream of liquid to the terminus of the inner conduit 2. The outermost conduit 6, in part, forms a chamber 8 within which the solid material suspended in the gas stream is scrubbed out of the gas stream by the liquid issuing from the conduit 4.

Conduit 2 has flange 10 for connection with a source of supply of the gas stream to be scrubbed. Flange 12 connects conduit 4 with a source of liquid material used to scrub the gas stream. Flange 14 is suitably used to connect the chamber 8, formed by outer conduit 6 and its continuation 16 with a vacuum pump (not shown), or other means, for creating a differential in pressure within the system decreasing from flange 10 to flange 14.

In the apparatus of Figs. I and II, at the terminus of the innermost conduit 2, there is provided a flared or beveled portion 20, which may have an overlaying sleeve or liner 22 of hydrophobic material completely covering the inner wall of conduit 2 in this region; the wall of conduit 2 in this portion thereof is beveled or flared outwardly, as shown, in order to provide, in cross-section, the frustum of a cone, which results in the terminus of conduit 2 having very nearly a knife edge 18.

Conduit 4 has a beveled or swaged portion 24 extending toward conduit 2 so as to form a narrow passageway 26 between conduit 4 and the knife edge 18 at the terminus of conduit 2. By means of this passageway 26, the liquid pumped into conduit 4, passes into the chamber 8 formed by outermost conduit 6 and the extension 16 thereof, as a sheet of liquid moving at comparatively high velocity.

Alternatively, the beveled or flared portion of innermost conduit 2 may take the forms shown in Figs. III and IV, as by providing extension 22, with the frustum 30, which may also be fashioned of, or lined with, hydrophobic material, extending outwardly from conduit 2 as shown in Fig. IV; conduit 4 may then terminate slightly above the juncture of extension 28 and frustum 30. Also, the extension 28 may be omitted as shown in Fig. V, and the surface of the frustum 30 which is continued from conduit 2, may be covered with hydrophobic material as shown.

The term "hydrophobic," as used herein, is intended to include those substances which are not wetted by water, aqueous solutions, or other liquid which may be used as the scrubbing medium in the apparatus of the present invention, and the terms "wet" or "wetted" are used herein to describe the tendency of a liquid in contact with a given surface to spread by molecular interfacial tension on that surface to a substantial degree and thereby to "wet" the surface.

In choosing a suitable material for the surface of the terminus of conduit 2, the chemical and physical nature of the substance associated with the gas stream, when such substance is dissolved or suspended in the scrubbing liquid, is to be taken into account.

Thus, where the substance associated with the gas stream is, when wetted by the scrubbing liquid, strongly adherent to metal surfaces, the portion of the terminus of conduit 2 with which such wetted substance may come into contact should be covered with a material not readily wetted by the scrubbing liquid. Examples of substances and scrubbing liquids of this general type are salts, such as sodium carbonate and sodium sulfate, and saturated aqueous solutions thereof.

However, where substances suspended in the gas stream have, when wetted by the scrubbing liquid, little or no tendency to adhere to metallic surfaces, the hydrophobic lining in the region of the terminus of conduit 2 may be dispensed with as shown in Fig. III. Examples of such substances are clays, alkaline earth metal carbonates, and alkaline earth metal silicates, all of which have a low solubility in a scrubbing liquid, such as water.

Although the underlying physical-chemical and aerodynamic principles applicable to the present invention have not been exhaustively investigated, it appears that the flared or beveled portions of conduit 2, as at 20 and 30 in the drawings, are equivalent means for effectively directing the gas and liquid streams issuing from conduits 2 and 4 respectively, until after they have passed the region of the terminus of conduit 2 and into chamber 8, where the maximum scrubbing effect of the liquid is obtained. By this means solid particles, or other substances, associated with the gas stream are not wetted by liquid, or are wetted only to a slight degree, at and near the opening of conduit 2 into chamber 8, where such wetted material could accumulate and ultimately plug the conduit. Moreover, there is evidence that by flaring the conduit 2, in the manner shown both at 20 and 30, the stream of gas issuing from conduit 2, as it expands, initially follows the flared surfaces to the stream of scrubbing liquid, carries the liquid stream in nearly a continuous sheet in a direction toward the walls of the chamber 8, away from the terminus of conduit 2 and the scrubbing efficiency of the apparatus is greatly increased. In addition, as the liquid impinges on the walls of chamber 8, a "splash" effect is obtained, whereby a large number of randomly moving particles of liquid are formed in contact with the gas in this region, a further factor in the scrubbing efficiency of the apparatus.

Also, it has been observed in operating the apparatus of the present invention, that when the terminus of conduit 2 is not flared, as at 20 or 30, and is placed in the environment shown, for example, in Figs. I and III, solid particles suspended in the gas stream readily become wetted by liquid from conduit 4; and, especially where the wetted solids tend to adhere to the surfaces at the terminus of conduit 2, comparatively rapid plugging of conduit 2 ensues. Similarly, in the form of the invention shown in Figs. IV and V, when flared member 30 is omitted, and the solid material suspended in the gas stream, when wet, tends to adhere to the surfaces at the terminus of conduit 2, plugging of conduit 2 by the wetted solids rapidly ensues.

In contrast, however, even under the most adverse conditions of high concentration of solids suspended in the gas phase, and chemical reaction (hydration) taking place between solids issuing with the gas stream from conduit 2 and liquid from conduit 4, the apparatus of the invention designed in accordance with the principles thereof, as shown in Figs. I to V, functions without plugging of conduits 2 and 6, even where the total solids throughput in the gas phase, depending on the size of the apparatus used, may reach as much as 50 to 100 tons/hour.

In operating the apparatus, a vacuum may be drawn on the chamber formed by outermost conduit 6 in order to create a differential in pressure decreasing between the conduits attached to flange 10 and flange 14. The liquid which is used to scrub the gas stream is introduced into conduit 4 in an amount, and at sufficient velocity, to insure formation of a nearly continuous sheet of liquid issuing from the teminus of conduit 4 within the chamber 8 formed by the outermost conduit 6. The gas to be scrubbed is then introduced through conduit 2, and solids or other substances associated with the gas stream moving at comparatively high velocity, for the most part, fall downwardly in the chamber 8 and then to a sump or other suitable collection zone. The smallest or lightest of the particles of solid material suspended in the gas will move in the direction taken initially by the gas as it expands within the chamber 8, i. e., moving in the direction of, and against, the nearly continuous sheet of liquid issuing from conduit 4. This movement of the gas stream finally causes the sheet of liquid to be broken up into small droplets which move outwardly toward and against the walls of the adsorption chamber, resulting in the "splash" effect noted above, whereby the particles in the gas stream are brought into contact with the droplets of liquid and are ultimately carried by the liquid downwardly into the collection zone. As the gas expands further in the chamber 8, it moves upwardly in a direction countercurrent to the liquid, into that portion of chamber 8 formed by the outer wall of conduit 4 and the inner wall of conduit 6, and ultimately to the region of the lowest pressure within the system.

As noted above, the outward flaring, 20 or 30, at the end of conduit 2 is of significance with regard to preventing plugging of conduit 2 by solids in the gas stream becoming wetted by liquid and the wetted solids adhering to, and bridging, the inner surfaces of the conduit. For example, sodium carbonate suspended in a gas stream passing through conduit 2, when wetted with a saturated solution of sodium carbonate, tends to agglomerate into compact cohesive masses and to be strongly adherent to metal surfaces with which it comes into contact; it has been observed that, in apparatus such as that shown in Figs. I and III, if a "doughnut" or torus-like ring of wetted, agglomerated, sodium carbonate particles should form on these surfaces of the flared portions 20 of conduit 2, such a ring builds up to only a very slight degree before it is readily broken away by the force of the stream of air and suspended sodium carbonate. Also, in the structure as shown in Figs. IV and V, there is little or no build-up of the wetted solids on either the extended surface 28, or flared portion 30, of conduit 2, under the above described conditions, and plugging of conduit 2 is prevented.

It is of importance to the present invention that the annular orifice formed by the outer wall of conduit 2 and the inner wall of conduit 4 be sufficiently small so that the amount of liquid being forced through conduit 4 forms a cylindrical sheet of liquid surrounding the mass of gas, and material associated therewith, issuing from inner conduit 2. It has been observed in the operation of the apparatus of the present invention that if this sheet of liquid is not formed, i. e., if the liquid issues from conduit 4 as several separate and comparatively large streams, little, if any, scrubbing effect is obtained; in this instance, if solid material is to be recovered from the gas stream, there is, of course, the consequent loss of solids through the conduit 6, and conduit 2 may become plugged with wetted solids comparatively rapidly.

A further point with respect to the design of the apparatus shown in the drawings is that it is preferable to have the ratio of the cross-sectional area of conduit 2, to the area of the cross-section of the space between conduits 2 and 4 above the swaging of conduit 4 to the cross-sectional area between conduits 4 and 6, above the swaging of conduit 4, substantially within the range of 0.95:1.4:5 to 1.4:1.6:5, in order to insure reasonable economy in design and coupled with suitable velocities of liquid and gas in the region of orifice 26.

While there have been described various embodiments of the invention, the methods and apparatus described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. An apparatus for effecting gas-liquid contact comprising, a chamber, means for introducing into said chamber a moving stream of gas, means surrounding said stream of gas for supplying a concurrently moving stream of liquid to said chamber, said means for supplying said stream of liquid being substantially co-extensive with said means for introducing said gas stream and being adapted to form a sheet of said liquid surrounding said stream of gas at the point of entry of said gas into said chamber, means exhausting gas from said chamber in a region thereof upstream from the point of entry of said gas stream into said chamber thereby to cause said stream of gas upon entering said chamber to expand and move radially outwardly against said sheet of liquid and subsequently countercurrent thereto, means for collecting liquid within said chamber, and means for maintaining the liquid level below the point of entry of said gas stream in the said chamber.

2. A gas-liquid contact apparatus comprising, a chamber, two concentrically arranged conduits opening into said chamber, the inner of said conduits being adapted to introduce a moving stream of gas into said chamber, the outer of said conduits being adapted to introduce a moving stream of liquid into said chamber, the termini of said conduits within said chamber being adapted to form a sheet of liquid surrounding said stream of gas, a third conduit opening into said chamber through which gas is withdrawn therefrom in a region upstream from the point at which said gas and liquid streams enter said chamber, thereby to cause the stream of gas entering said chamber to move radially outwardly against said sheet of liquid and countercurrently thereto in the direction of said third conduit, and means for withdrawing liquid from said chamber and maintaining the liquid level within said chamber below the termini of said conduits.

3. A gas-liquid contact apparatus comprising, three concentrically arranged conduits, the innermost conduit being adapted to convey a gas stream, the intermediate conduit being substantially co-extensive with said innermost conduit and adapted to convey a liquid stream, the outermost conduit forming a chamber in which the other two of said conduits terminate and having means located upstream from the termini of said innermost and said intermediate conduits for exhausting gas from said chamber, the terminal portion of said innermost conduit within said chamber forming a frustum of a cone, said intermediate conduit being adapted at its terminus to form a sheet of liquid surrounding the terminus of said innermost conduit, and said means for exhausting gas from said chamber being adapted to impose a pressure differential on the gases within said chamber decreasing from the terminus of said innermost conduit to said means for exhausting gas from said chamber.

4. A gas-liquid contact apparatus comprising, three concentrically arranged conduits, the innermost conduit being adapted to convey a gas stream, the intermediate conduit being substantially co-extensive with said innermost conduit and adapted to convey a liquid stream, the outermost conduit forming a chamber in which the other two of said conduits terminate and having means for removing liquid from said chamber, said innermost conduit being flared in the region of the terminal portion thereof within said chamber, said intermediate conduit being adapted at its terminus to form a sheet of liquid surrounding the terminus of said innermost conduit, and means in conjunction with said outermost conduit, including a conduit opening into said chamber in a region thereof remote, and in a direction upstream, from the termini of said innermost and said intermediate conduits for exhausting gas from said chamber and maintaining subatmospheric pressures therewithin.

5. The apparatus of claim 4 in which said flared portion of said innermost conduit is formed at the terminus of said innermost conduit.

6. The apparatus of claim 5 in which the boundary wall between said innermost conduit and said intermediate conduit is flared at the terminus of said innermost conduit.

7. The apparatus of claim 6 in which said flared portion of said innermost conduit is covered with a hydrophobic material on the surface of said innermost conduit in contact with said gas stream.

8. The apparatus of claim 5 in which the flared portion of said innermost conduit extends outwardly into the path of the sheet of liquid from said intermediate conduit.

9. The apparatus of claim 8 in which said flared portion of said innermost conduit is covered with a hydrophobic material on the surface of said innermost conduit in contact with said gas stream.

References Cited in the file of this patent

UNITED STATES PATENTS

| | | |
|---|---|---|
| Re. 22,590 | Miller | Jan. 16, 1945 |
| 1,839,952 | Daily | Jan. 5, 1932 |
| 2,489,031 | Hillringhouse | Nov. 22, 1949 |

FOREIGN PATENTS

| | | |
|---|---|---|
| 290 | Great Britain | Jan. 4, 1907 |
| 326,569 | Germany | Sept. 29, 1920 |
| 605,026 | France | Feb. 8, 1926 |